United States Patent
Lavelle et al.

(10) Patent No.: US 6,778,179 B2
(45) Date of Patent: *Aug. 17, 2004

(54) EXTERNAL DIRTY TAG BITS FOR 3D-RAM SRAM

(75) Inventors: Michael G. Lavelle, Saratoga, CA (US); Ewa M. Kubalska, Sun Jose, CA (US); Yan Yan Tang, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 09/970,113

(22) Filed: Oct. 3, 2001

(65) Prior Publication Data

US 2002/0171657 A1 Nov. 21, 2002

Related U.S. Application Data

(63) Continuation-in-part of application No. 09/861,172, filed on May 18, 2001.

(51) Int. Cl.$^7$ ................................................ G09G 5/36
(52) U.S. Cl. ...................... 345/557; 345/531; 345/554; 345/556; 345/559; 711/122
(58) Field of Search .............................. 345/557, 552, 345/545, 530, 531, 532, 559, 561, 562, 536–538, 554, 556; 711/118, 119, 122, 141–144, 131, 100, 104, 105

(56) References Cited

U.S. PATENT DOCUMENTS

| | | | |
|---|---|---|---|
| 5,544,306 A | * | 8/1996 | Deering et al. .............. 345/545 |
| 5,579,473 A | | 11/1996 | Schlapp et al. |
| 5,767,865 A | | 6/1998 | Inoue et al. |
| 5,900,016 A | | 5/1999 | Ghosh |
| 5,987,544 A | | 11/1999 | Bannon et al. |
| 6,000,017 A | * | 12/1999 | Hayek et al. ................ 711/144 |
| 6,195,106 B1 | | 2/2001 | Deering et al. |
| 6,262,748 B1 | | 7/2001 | Deering et al. |
| 6,437,789 B1 | * | 8/2002 | Tidwell et al. .............. 345/557 |
| 6,483,516 B1 | * | 11/2002 | Tischler ....................... 345/552 |
| 6,504,550 B1 | | 1/2003 | Schlapp |
| 6,535,218 B1 | | 3/2003 | Schlapp |
| 6,559,851 B1 | | 5/2003 | Schlapp |

* cited by examiner

*Primary Examiner*—Kee M. Tung
(74) *Attorney, Agent, or Firm*—Meyertons Hood Kivlin Kowert & Goetzel, P.C.; Jeffrey C. Hood

(57) ABSTRACT

An external cache management unit for use with a 3D-RAM frame buffer and suitable for use in a computer graphics system is described. The unit may reduce power consumption within the 3D-RAM by performing partial block write-back according to status information stored in an array of dirty tag bits. Periodic level one cache block cleansing is provided for during empty memory cycles.

36 Claims, 15 Drawing Sheets

EXTERNAL DIRTY TAG BITS FOR 3D-RAM SRAM

CROSS-REFERENCES TO RELATED APPLICATIONS

This is a continuation-in-part of co-pending U.S. application Ser. No. 09/861,172 titled "Dirty Tag Bits for 3D-RAM SRAM", filed May 18, 2001, by Michael G. Lavelle, Ewa M. Kubalska, and Yan Yan Tang.

BACKGROUND OF THE INVENTION

1. Field of the Invention

This invention relates generally to the field of computer graphics and, more particularly, to graphics frame buffer architecture.

2. Description of the Related Art

With each new generation of graphics system, there is more image data to process and less time in which to process it. This consistent increase in data and data rates places additional burden on the memory systems that form an integral part of the graphics system. Attempts to further improve graphics system performance are now running up against the limitations of these memory systems in general, and memory device limitations in particular.

In order to provide memory systems with increased data handling rates and capacities, system architects may employ consistently higher levels of integration. One example of increased integration is the 3D-RAM family of memories from the Mitsubishi Corporation. The 3D-RAM incorporates four banks of DRAM main storage with level one and level two cache memories, and a bank-swapped shift register capable of providing an uninterrupted stream of sequential data at current pixel clock speeds.

Some previous incarnations of the 3D-RAM architecture have included cache management functions as well. In these older devices, circuitry was integrated to allow for the efficient write-back of modified or "dirty" data in the level one cache to the level two cache, and ultimately back to the DRAM. However, as these devices have grown in capacity and performance, it has become increasingly difficult and costly to integrate these cache management functions. In the most recent 3D-RAM device, the 3D-RAM64 these cache management functions have been abandoned altogether having finally become economically infeasible. Despite exclusion within the 3D-RAM devices, these cache management functions are still desirable as they may significantly decrease power consumption and increase memory performance. Furthermore, the cache management functions may also provide the ability to accomplish a maskable write operation from level one to level two cache memories. A maskable write operation between the two cache memories may provide an efficient means for performing area and pattern fills, both of rectangular and irregularly shaped areas. For these reasons, a system and method for externally managing the cache memory of 3D-RAM devices employed in graphics systems is desired.

SUMMARY OF THE INVENTION

The problems set forth above may at least in part be solved in some embodiments by a system or method for managing a 3D-RAM cache through the employment of external dirty tag bits. In one embodiment, the system may include a memory array of 3D-RAM devices configured to receive and store pixel data. A memory request processor may be connected to the memory and may be configured to maintain an array of dirty tag bits (i.e., setting and clearing the logic state of the dirty tag bits in response to cache requests and pixel write operations). The memory request processor may be further configured to periodically synchronize the pixel data in the 3D-RAM level two and level one caches by commanding level one cache write-backs. These write-back operations may be modified by the memory request processor to incorporate the information stored in the dirty tag bits, thus allowing only modified pixel data in the level one cache to be written-back. This may be accomplished by placing the dirty tag bit contents on the 3D-RAM DRAM control bus on the cycle subsequent to the cycle containing the write-back command.

As noted above, a method for managing 3D-RAM cache through the employment of external dirty tag bits is also contemplated. In one embodiment, the method includes grouping the dirty tag bits into status words, where each status word is associated with a block of level one cache memory. The blocks of level one cache memory are examined sequentially by first waiting for an empty memory cycle. Next, the status word associated with the block under examination is retrieved and the dirty tag bits are tested. If the test indicates that any pixel data has been modified, then a block write-back is requested. The status word is transferred along with the request in order that only the modified pixel values are written-back to the level two cache. Next, the status word is updated to indicate that all pixel data within the block under examination is unmodified.

In one embodiment, the cache management system may be integrated into a graphics system suitable for creating and displaying graphic images. In other embodiments, the system may be part of an optional assembly, communicating with a host graphics system through the use of a data or control bus specific to the host.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
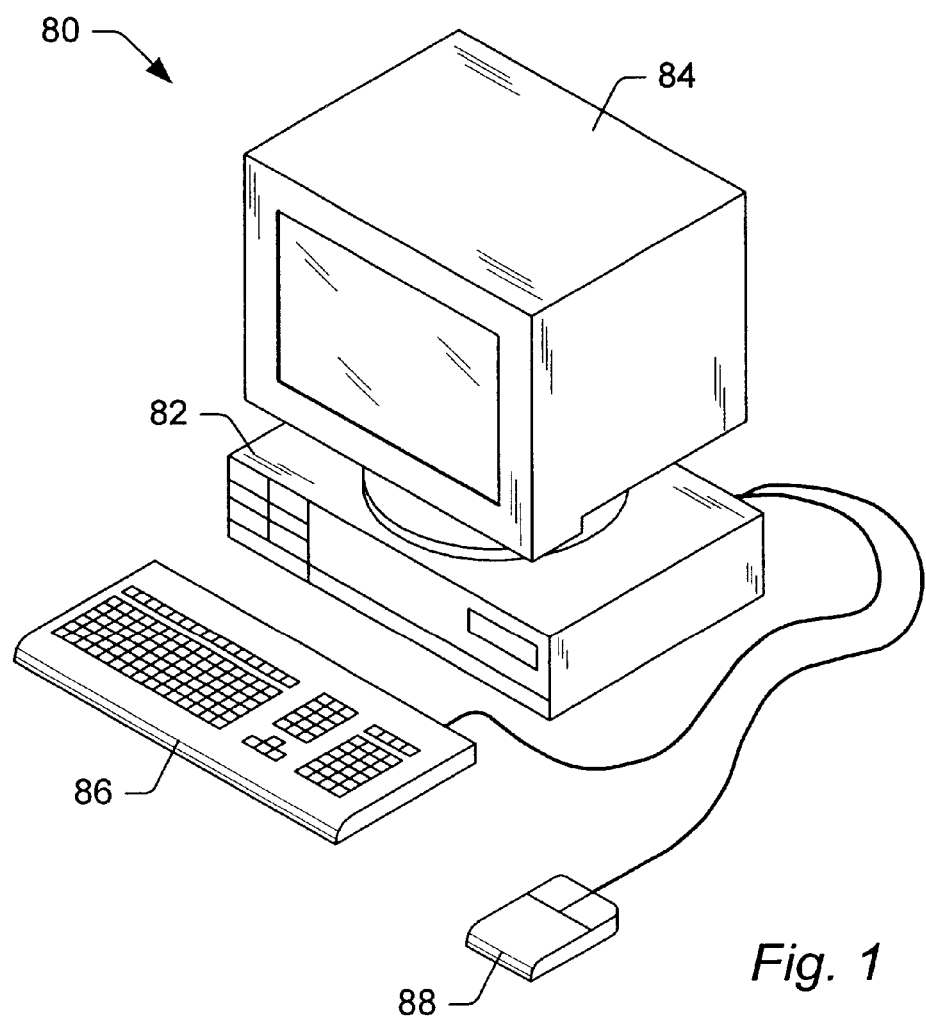
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

Referring now to FIG. 1, one embodiment of a computer system 80 that includes a graphics system that may be used to implement one embodiment of the invention is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
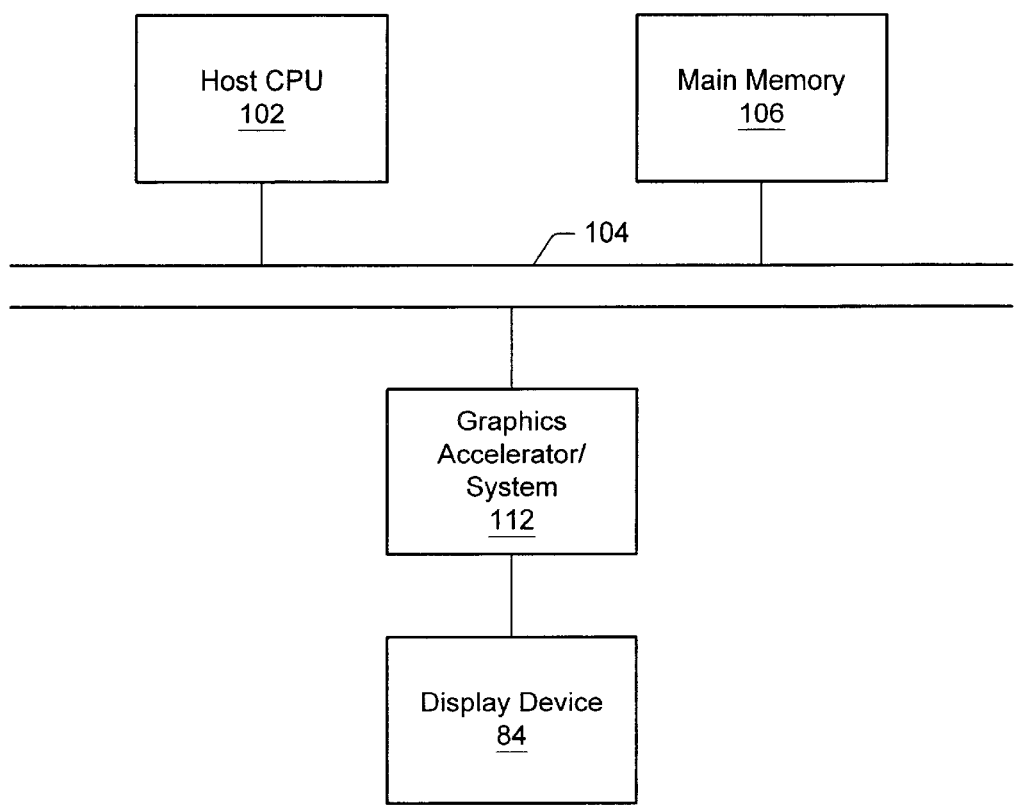
FIG. 2 is a simplified block diagram of one embodiment of a computer system.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
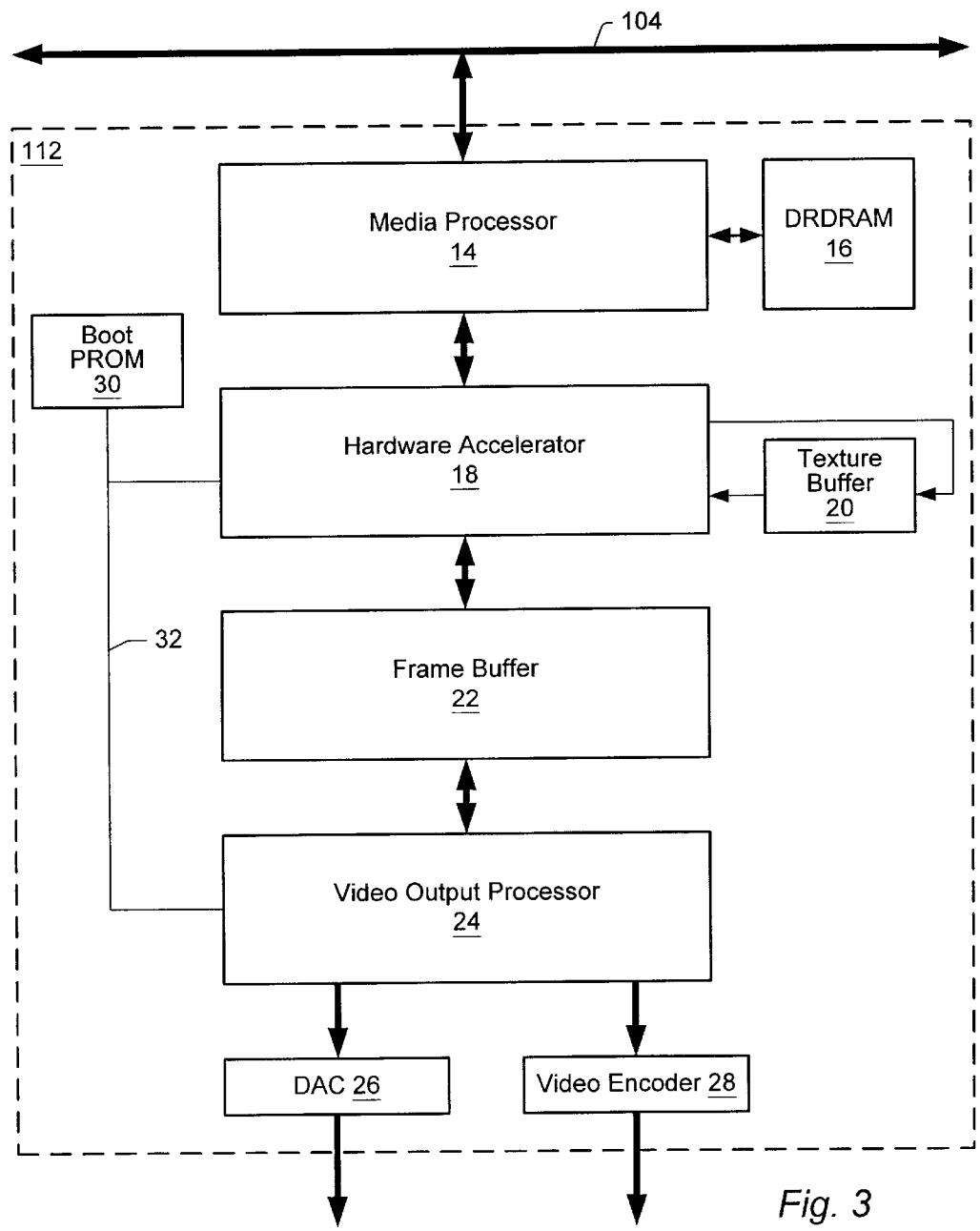
FIG. 3 is a functional block diagram of one embodiment of a graphics system.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown).

Media processor 14 and/or hardware accelerator 18 may be any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Each functional block of graphics system 112 is described in more detail below.

Figure 4:
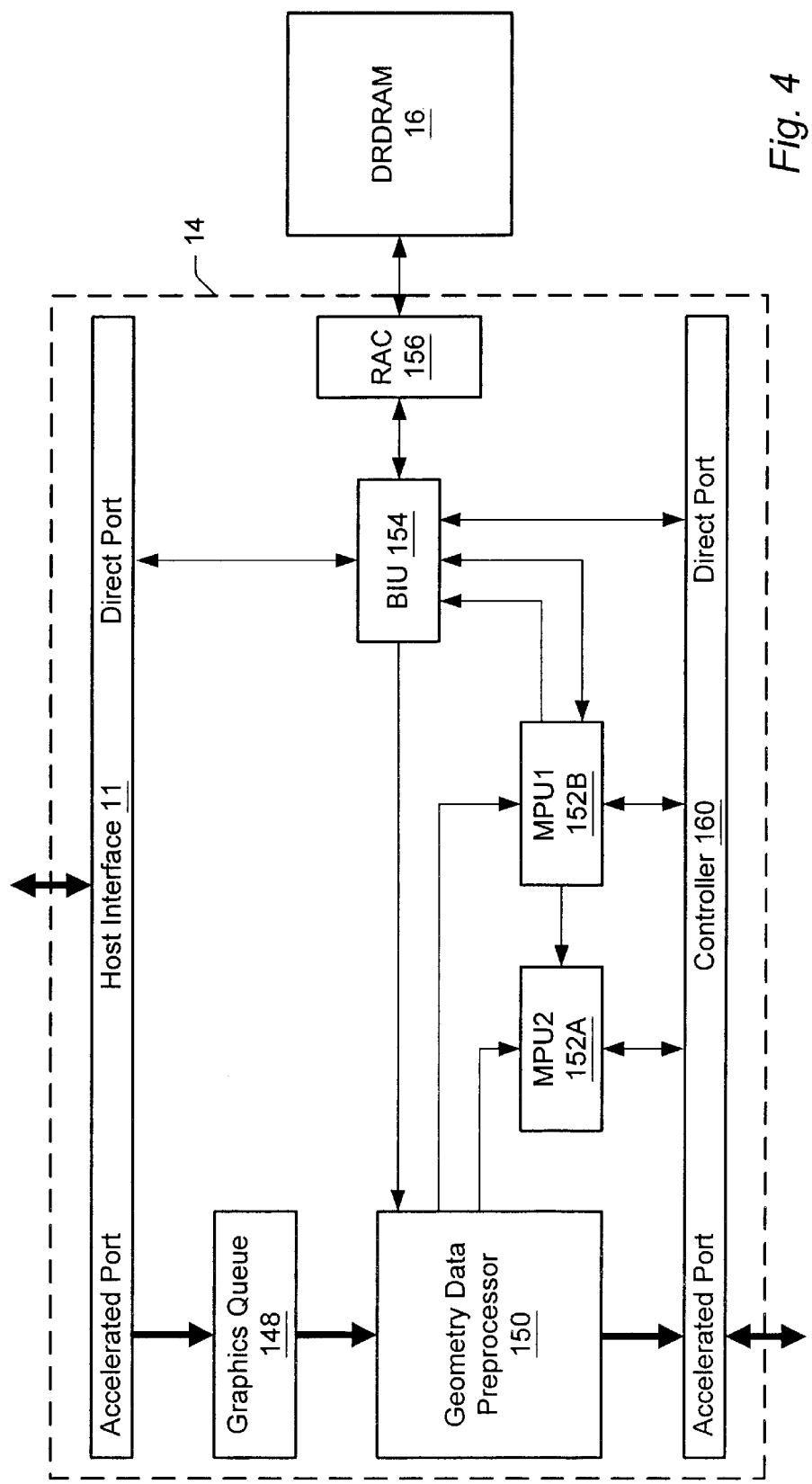
FIG. 4 is a functional block diagram of one embodiment of the media processor of FIG. 3.

Media Processor—FIG. 4

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
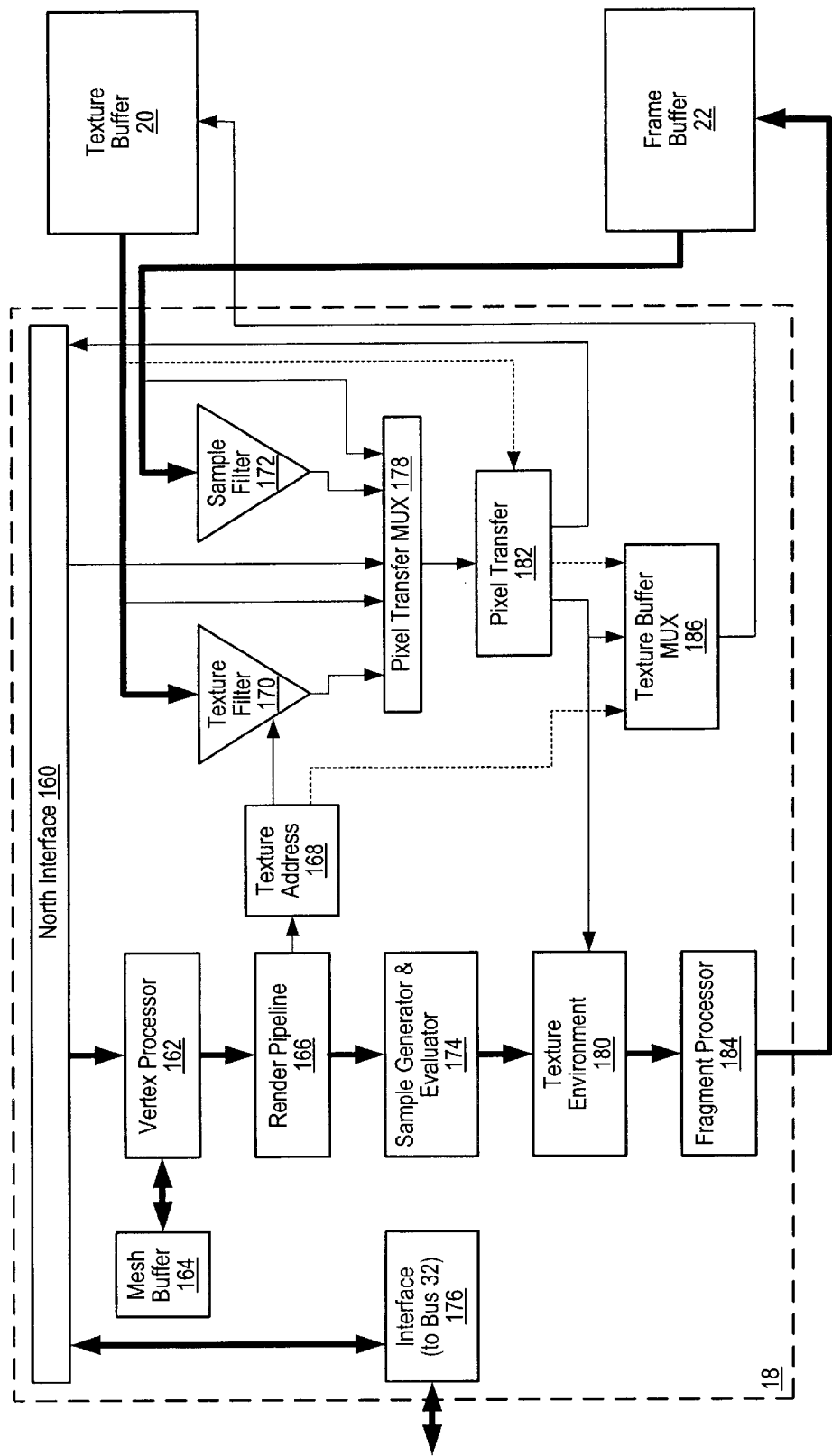
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data. Each of these features is described separately below.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 160 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 160, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture buffer 20 (via the texture buffer MUX 186), the frame buffer 22 (via the texture environment unit 180 and the fragment processor 184), or to the host (via north interface 160). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer—20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Figure 6:
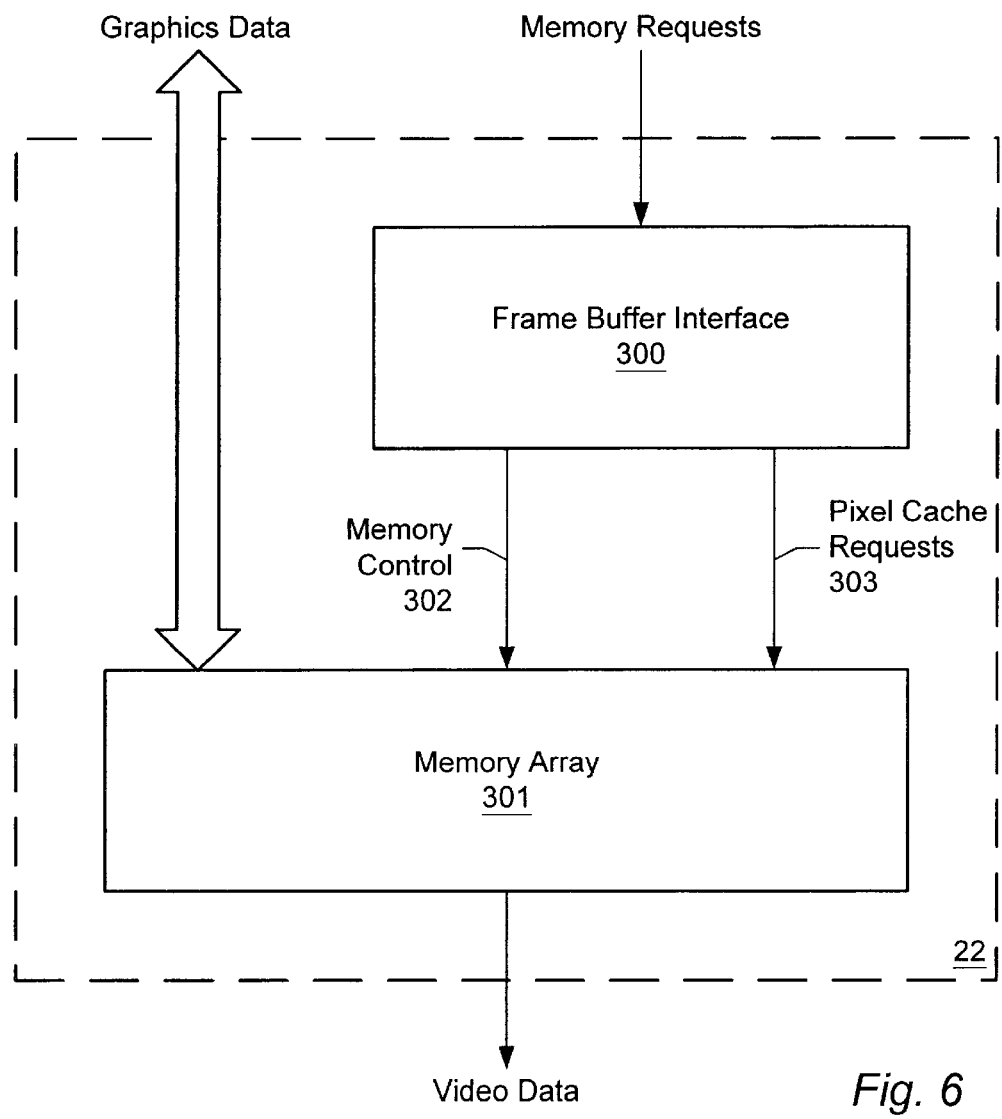
FIG. 6 is a simplified block diagram of one embodiment of the frame buffer of FIG. 3.

One or more frame buffers 22 may be configured to receive and store data samples from hardware accelerator 18. In one embodiment, the frame buffer 22 may take the form illustrated in FIG. 6. In this example, the frame buffer interface 300 may be configured to receive requests and data from the fragment processor 184. These requests may be for the storage, retrieval, or manipulation of pixel data. In processing these requests, the frame buffer interface may determine what portion of the memory array 301 contains the requested data, test for cache hits, and schedule requests to the memory array 301, in addition to other functions as explained in greater detail below.

The memory array 301 may be configured to receive controls from the frame buffer interface 300. In response to these controls, the memory array 301 may perform data storage and retrieval, fetches, cache write-backs; and other operations. Pixel data may be transferred bi-directionally between the memory array 301 and the fragment processor 184 either as individual pixels or tiles of pixels. The memory array 301 may also be further configured to output a continuous stream of pixels to the video processor 24.

Figure 7:
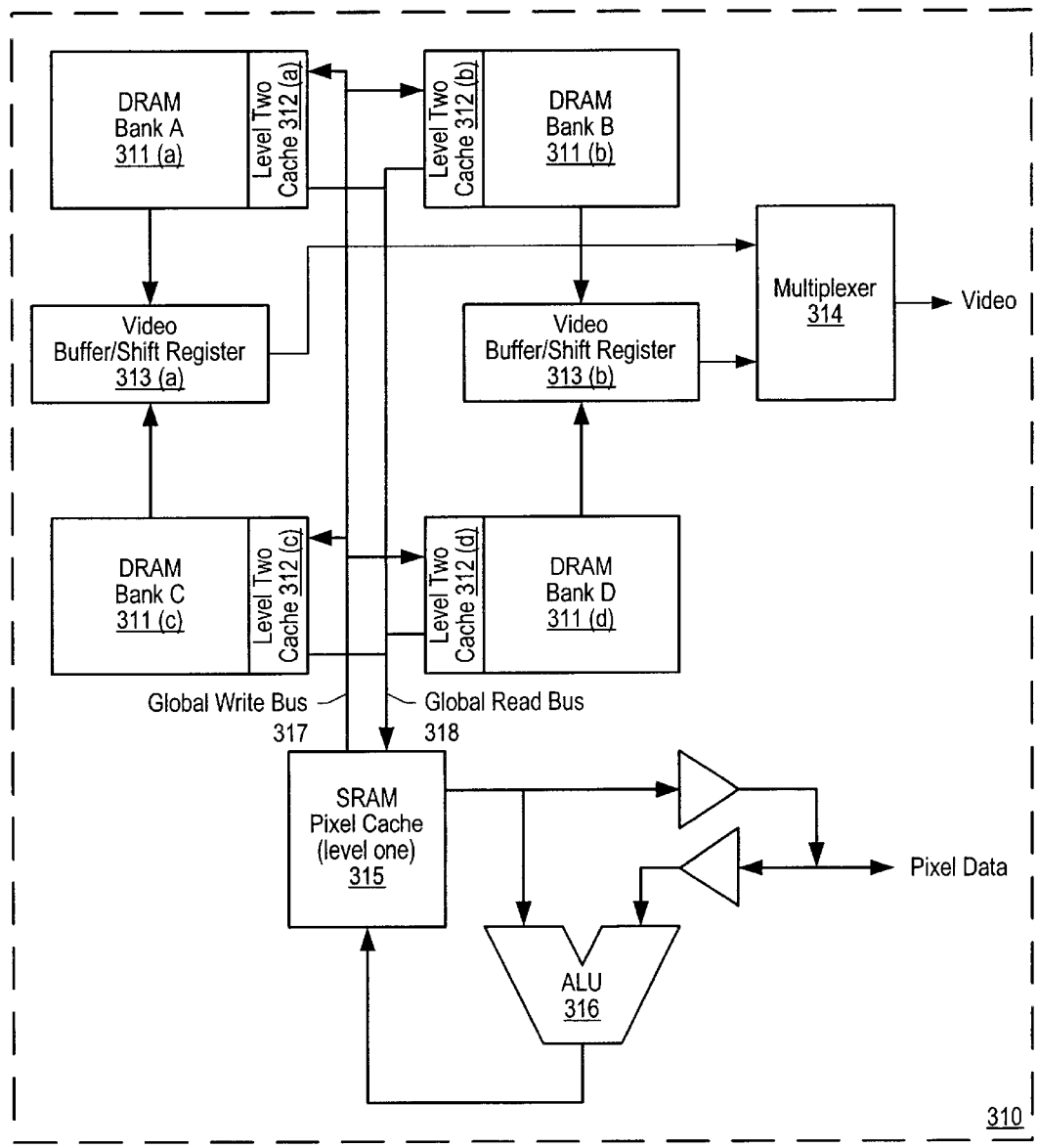
FIG. 7 is a functional block diagram of one embodiment of a 3D-RAM device.

In one embodiment, the memory array 301 may employ one or more 3D-RAM 310 memory devices. Turning now to FIG. 7 a simplified block diagram of one possible 3D-RAM configuration is illustrated. The total storage capacity of the device may be divided equally among four DRAM banks 311. Each bank may be further subdivided into a number of pages which represent the smallest unit of data in a DRAM bank 311 which may be accessed directly. All four DRAM banks 311 respond to a common page address to form a page group.

To facilitate accessing pixel data within a page, each DRAM bank 311 may be furnished with a level two cache 312. In this example, the level two cache 312 is sized appropriately to hold one entire page of data and may in some cases be referred to as a "page buffer". Hence, as commands are issued to the 3D-RAM 310 which result in the access of pixels within the DRAM, entire pages are transferred between the DRAM and the level two cache 312. In some embodiments, this level two cache may be configured as a write-through cache (i.e., as data is written to the cache, the data is also written through, directly to the DRAM).

Each page of storage may be further subdivided into blocks. In this example, the global write bus 317 and the global read bus 318 are sized to allow the parallel transfer of an entire block of pixels. For many memory operations, this would be the method employed for transferring pixel data between the level two cache 312 and the SRAM pixel cache 315, with the SRAM pixel cache having enough storage for multiple blocks. However, during cache write-back operations, it is inefficient from a power standpoint to transfer an entire block of pixels when a small percentage of pixels within that block contain modified values. Consequently, a write partial block command may be implemented in the 3D-RAM 310. The write partial block command employs an operand or tag which contains bits indicative of the pixels within the block which contain modified values. Upon issuance of this command, only these modified values are written back to the level two cache.

The SRAM pixel cache 315 may constitute a level one cache memory, configured so that a single cache tag entry corresponds to a block of pixel data. In this configuration, each block in the SRAM pixel cache 315, contains spatially relevant or contiguous pixel data, however the blocks themselves may not be contiguous. Additionally, each block of pixels in the SRAM pixel cache 315 may correspond to data stored in one and only one DRAM bank 311.

In one embodiment, the SRAM pixel cache 315 may be a multi-ported memory, with one input port and one output port dedicated to the transfer of data between the SRAM and the level two caches 312. A third port may be a dedicated input and receive the output of the ALU 316 which is described below. Another port may be a dedicated output which may be utilized to furnish the ALU 316 with an operand, or to communicate pixel data to circuitry outside the 3D-RAM 310.

The ALU 316 receives as one operand, inbound pixel data communicated from circuitry outside of the 3D-RAM 310. The second operand is fetched from a storage location within the SRAM pixel cache 315. The ALU may be configured to implement a number of mathematical functions on the operands in order to effect the combination or blending of new pixel data with data existing in the 3D-RAM 310. An example of one such operation may be a weighted sum, wherein pixel data is weighted and combined according to some level of transparency. The ALU 316 thus allows the 3D-RAM 310 to transform many read-modify-write operations into write-mostly operations.

The 3D-RAM 310 may also be equipped two video buffer/shift registers 313. These shift registers are configured as parallel-in-serial-out devices, which may be broad-side loaded with full or partial display lines of pixel data. The shift registers 313 may then output the data sequentially in response to an external pixel clock. In order to provide for a continuous stream of pixels at the video output, the two shift registers may alternate duty (i.e., one loading data while the other is outputting data). The outputs of the two shift registers may then be combined in to a single stream of video data by a multiplexer 314.

Figure 8:
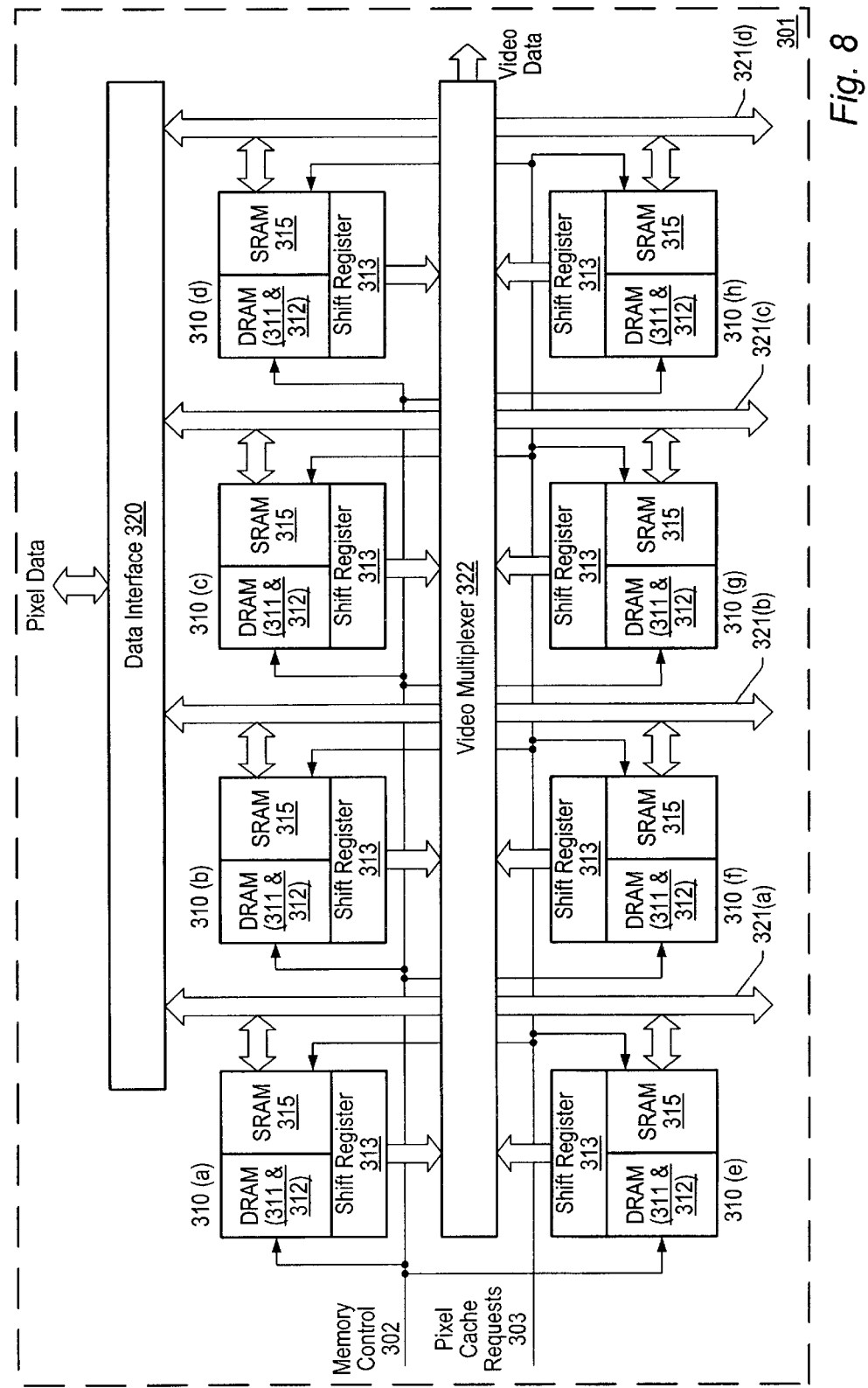
FIG. 8 is a functional block diagram of one embodiment of the memory array of FIG. 6.

Turning now to FIG. 8, one embodiment of the memory array 301 is shown. In this example, 3D-RAM devices 310 are employed, and the array is segmented to facilitate the storage of tiles of pixels or samples. A tile of pixel data is delivered to the bi-directional data interface 320 from the fragment processor 184. Within the data interface 320 the tile may be buffered and the pixels comprising the tile may be reordered to maintain the spatial interrelationship of the pixels. In this embodiment of the memory array 301, the tile is assumed to have four pixels. Consequently, the pixel data leaves the data interface 320 on four bi-directional data buses 321. These data buses 321 divide the memory array 301 into columns of 3D-RAM devices 310.

In this embodiment of the memory array 301, inbound pixel data being stored in the array is written into the SRAM 315 of the 3D-RAM devices 310. As described earlier, this SRAM acts as a level one cache memory. Pixel cache requests 303 are received from the pixel request processor 336 (described in detail below) and may include the target address of the pixel data. The 3D-RAM devices 310 which comprise the target of the storage address may also be indicated in the target address. Along with the target address, opcodes for ALU 316 may be sent allowing for the arithmetic combination of the pixel data with data already stored in the memory array 301.

In performing some operations (e.g., scaling rendered data to change the effective zoom factor of the displayed image), the hardware accelerator 18 may also request pixel data from the memory array 301. If the requested pixel data is currently residing in the level one cache memory 315, then the pixel request processor 336 issues pixel cache requests 303 to the memory array 301. These requests may include the source address of the data to be retrieved, as well as an indication of which 3D-RAM devices 310 the data is to be found in. The 3D-RAM devices respond by placing the requested data on the data buses 321 where it is delivered to the data interface 320. Within the data interface 320, the pixels may be reordered when recombined into a tile in order to maintain any spatial interrelationships. Once the tile is constructed the data may be buffered and delivered to the fragment processor 184.

When pixel data that is requested from the memory array 301 is not currently residing in the level one cache 315 (i.e., a level one cache miss), a cache operation may be requested prior to the issuance of any pixel cache requests 303. If the data is determined to be located in the level two cache 312 (i.e., a level two cache hit), then the memory request processor 335 (described in detail below) may request a block transfer by asserting the appropriate memory control signals 302. In this case, a block of memory within the level one cache 315 may be allocated, and a block of pixel data may be transferred from the level two cache 312 to the level one cache 315. After this transfer is completed, the pixel cache requests 303 described above may be issued.

If the requested data is not found in the level two cache (i.e., a level two cache miss), then the memory request processor 335 may request a page fetch by asserting the appropriate memory control signals 302. In this case, an entire page of pixel data is read from the appropriate DRAM bank 311 and deposited in the associated level two cache 312. Once the page fetch is completed, then the block transfer and pixel cache requests 303 described above may be issued.

The 3D-RAM devices 310 may also receive requests for video which cause data to be internally transferred from the appropriate DRAM banks 311 to the shift registers 313. In the embodiment shown, the video streams from all 3D-RAM devices 310 in the array are combined into a single video stream through the use of a multiplexer 322. The output of the multiplexer 322 may then be delivered to the video output processor 24 described in more detail below. In other embodiments of the memory array 301, the video streams from each 3D-RAM may be connected in parallel to form a video bus. In this case, the shift registers 313 may be furnished with output enable controls, where the assertion of an output enable may cause the associated shift register 313 to place data on the video bus.

Figure 9:
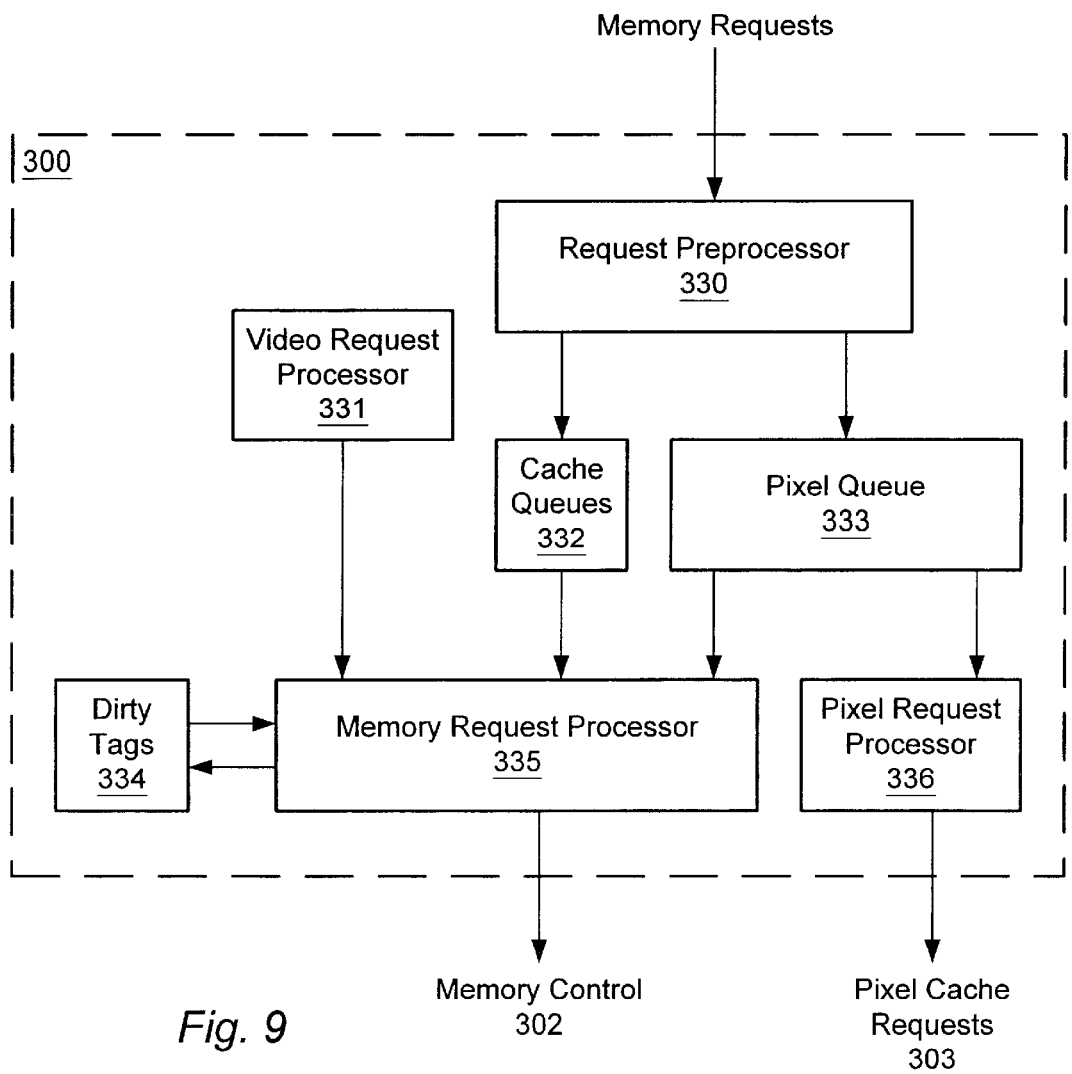
FIG. 9 is a functional block diagram of one embodiment of the frame buffer interface of FIG. 6.

Turning now to FIG. 9, one embodiment of the frame buffer interface 300 is shown. The request preprocessor 330 may be configured to receive requests related to pixels contained in the memory array 301. These requests may represent pixel storage/retrieval, manipulation, fill, or other operations. The submitted request is examined, and the page and block address of the corresponding pixel in the memory array is determined. Within the request preprocessor 330, tag lists may be maintained for both the level one and the level two caches. These tag lists may represent the current state of the caches, as well as any pending cache requests already in the cache queues 332. The tag lists are examined against the page and block addresses of the targeted pixel for a hit indicating that the pixel is currently cached. If the examination reveals that the pixel is already in the level one cache, then a request may be placed in the pixel queue 333. Otherwise, the miss is evaluated as either a level one or a level two miss, and a request to the appropriate cache or caches is placed in the cache queue 332.

In this example, the cache queues 332 are two small queues which may operate in a FIFO mode and may differ in depth. Where the queue for the level two cache may be 4 entries deep, the queue for the level one cache may be 8 entries, or twice as large. The cache queues 332 receive queue requests from the request preprocessor 330 and buffer them until the memory request processor 335 is able to service them. Requests placed in the level two cache queue may include an indication of a page address to fetch and a bank from which to fetch the page. Requests placed in the level one cache may be slightly more complicated, including not only a block address, but also an opcode indicating a fetch, fast fill, memory mode change or other operation to be performed on the cache.

The pixel queue 333 is a small FIFO memory, which may be larger than either of the two cache queues 332. In this example, the pixel queue 333 may be 16 entries deep and logically divided into a pixel address queue and a pixel data queue. The pixel queue 333 receives requests to store, fetch or modify pixels from the request preprocessor 330, and buffers them until the pixel request processor 336 is able to service them.

The memory request processor 335 receives requests from both the cache queues 332 and the pixel queue 333 and issues the appropriate DRAM controls to the memory array 301. The memory request processor 335 maintains a second set of tag lists for the level one and level two caches. Unlike the tag lists which are maintained by the request preprocessor 330, the tag lists within the memory request processor contain only the current state of the two caches. In evaluating the requests from the queues, page and block addresses are checked against the cache tag lists and misses are translated into the appropriate fetch operations.

The memory request processor 335 may also be responsible for cleansing blocks within the SRAM pixel cache 315. Information is maintained within the memory request processor 335 which describes the current status of each block of pixel data currently residing in the level one cache. The status may include a tag indicating that the block is "dirty" (i.e., pixel data within the block has been modified). The status may also include a tag maintained and associated with a block which describes the usage. The most recently accessed block in the cache may have a low or zero value for this tag, whereas a block that has not been recently accessed may have a high value. The memory request processor 335 utilizes this status information to periodically write back dirty blocks that have not been accessed recently to the level two cache 332. In this manner, least recently used blocks are kept clean, and hence kept available for future allocation.

Frequently, a dirty block may contain a small percentage of modified pixel values. In these cases, it may be inefficient from a power standpoint to write back the entire block. Therefore, an array of dirty tags 334 is maintained within the frame buffer interface 300. In one embodiment, these dirty tags 334 may comprise a collection of flip-flops with one flip-flop reserved for each pixel value in the SRAM pixel cache 315. If the graphics system contains more than one 3D-RAM, then there may be several banks of dirty tags 334, one bank for each 3D-RAM in the system. Thus, when performing a write-back operation from the SRAM pixel cache 315 to the level two cache 332, the memory request processor 335 may issue a write partial block command. Along with the command, the memory request processor may communicate the portion of the dirty tags 334 that correspond to the block being transferred. In this example, the dirty tags 334 may be used to control the block write-back so that only the modified pixel values are transferred back to the level two cache 332, thus potentially reducing the power required to execute the transfer.

The pixel request processor 336 may be configured to receive requests from the pixel queue 333. In response to these requests, the pixel request processor 336 may issue commands to the memory array 301. These commands at least in part may control the way in which the ALU 316 treats pixel data as the pixel data is routed to the memory for storage. Thus the pixel request processor 336 not only directs pixel movement through the memory, but also the manipulation of these pixels. The pixel request processor 336 may be additionally configured to maintain information related to the most recent instructions issued to the memory array 301, and in this way internally track or predict the progress of pixels through the processing pipeline of the 3D-RAM.

The video request processor 331 may be configured to receive and process requests for video from the memory array 301. These requests may contain information describing the page where the desired data is located, and the display scan line desired. These requests may be formatted and stored until the memory request processor 335 is able to service them. The video request processor 331 may also employ a video request expiration counter. This expiration counter may be configured to determine deadlines for requests issued to the memory array 301 in order to produce an uninterrupted stream of video data. In circumstances where a request is not issued within the allotted time, the video request processor may issue an urgent request for video.

Figure 10:
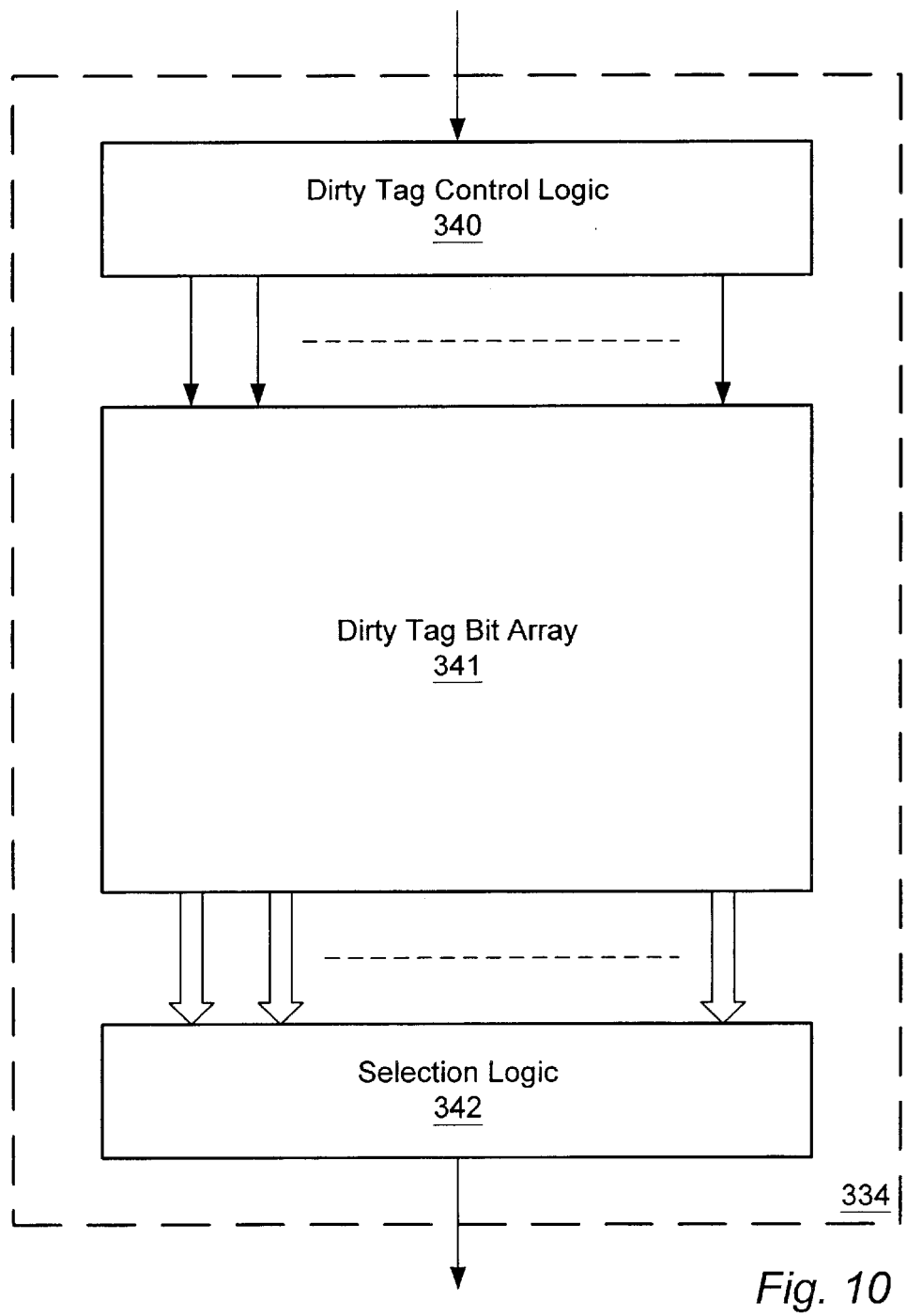
FIG. 10 is a simplified block diagram of one embodiment of the dirty tags of FIG. 9.

Turning now to FIG. 10, one embodiment of the dirty tags is illustrated. The dirty tag control logic 340 may be employed to listen to cache requests and pixel operations as described above and translate these events into controls which affect the contents of the dirty tag bit array 341. In this example, any block transfer occurring between a level two cache 312 and a level one cache 315 may be translated to control signals which cause all dirty tag bits associated with the block to be set to a known state indicating that the pixel data is unmodified. In this case, "unmodified" means that the block of data residing in the level one cache 315 is equivalent to the copy held in the level two cache 312, and hence the same as the original data stored in the associated DRAM bank 311. The dirty tag control logic 340 may also translate a pixel storage operation into control signals which cause the dirty tag bits associated with the pixel data to be set to a known state indicating that the data has been modified. In this case, "modified" means that the indicated pixel data in the level one cache 315 may be different from the copy held in the level two cache 312, and hence different from the original data stored in the associated DRAM bank 311.

The selection logic 342 may receive requests from the memory request processor 335. These requests may relate to the block cleansing function as described above. In response to these requests, the selection logic 342 may select and output the status values stored in the dirty tag bit array 341 flip-flops associated with the block under examination.

Figure 11:
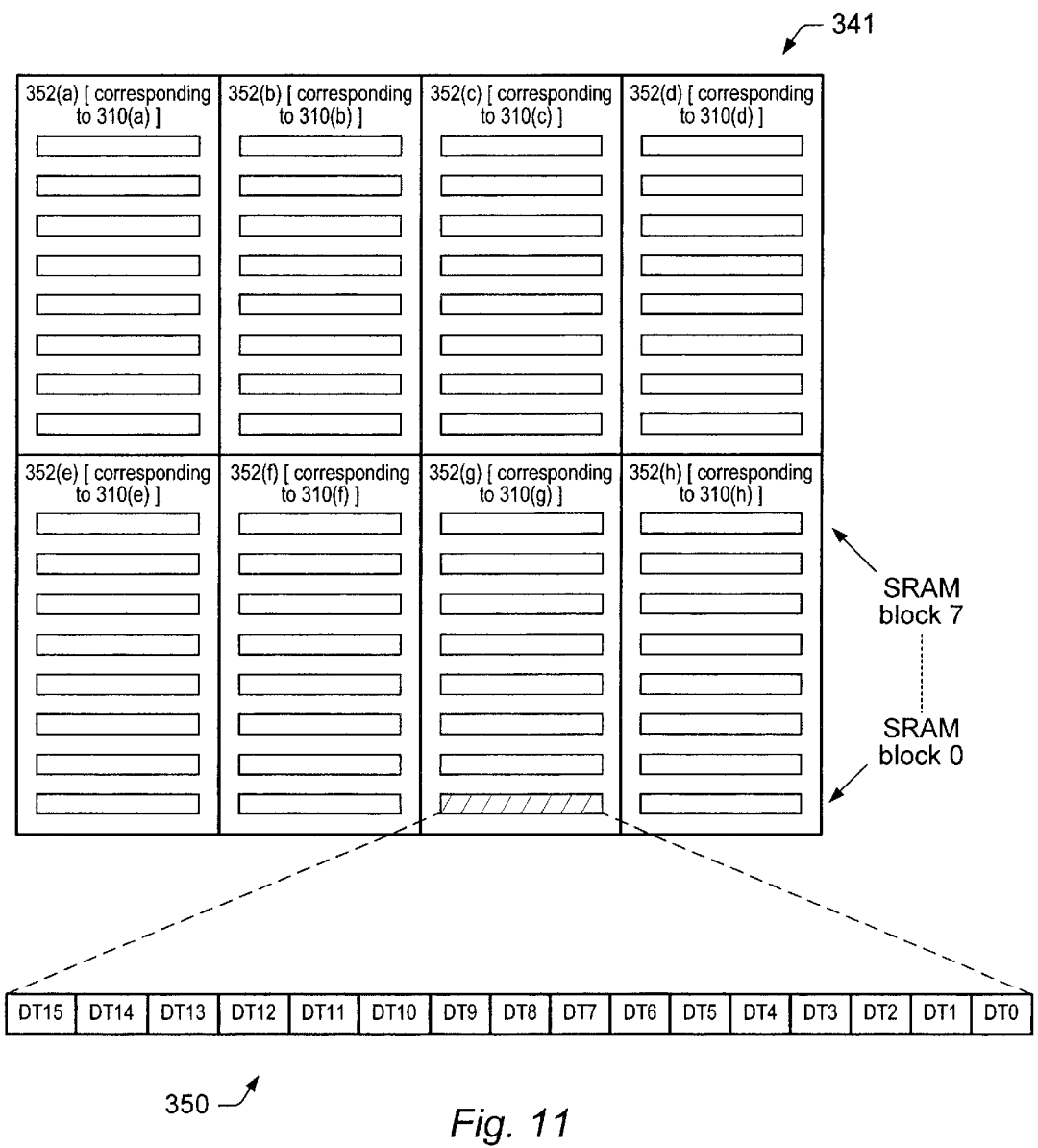
FIG. 11 is a diagrammatic illustration of one embodiment of the dirty tag bit array structure in FIG. 10.

Turning now to FIG. 11, one embodiment of the internal structure of the dirty tag bit array 341 is illustrated. In this example, the memory array 301 is assumed to comprise eight 3D-RAM devices 310, and hence eight level one caches 315. In addition, this example further assumes that each level one cache 315 comprises eight blocks of pixel data, and that each block comprises sixteen pixels.

In accordance with the preceding assumptions, the dirty tag bit array 341 may be divided into eight sections 352(a–h) with each section corresponding to one 3D-RAM device 310 in the memory array 301. Each of the eight sections 352 (a–h) may be further subdivided into eight status words 350, where each word is associated with a block of memory in the level one cache 315. Lastly, each word may comprise sixteen bits with each bit corresponding to one pixel within a block of level one cache 315 memory. The individual bits may be physically represented by a single flip-flop or memory cell which holds the status information of the associated pixel (e.g., if the flip-flop contains a logic 1, then the associated pixel may be indicated as being modified, whereas if the flip-flop contains a logic 0, then the associated pixel may be indicated as being unmodified).

Figure 12:
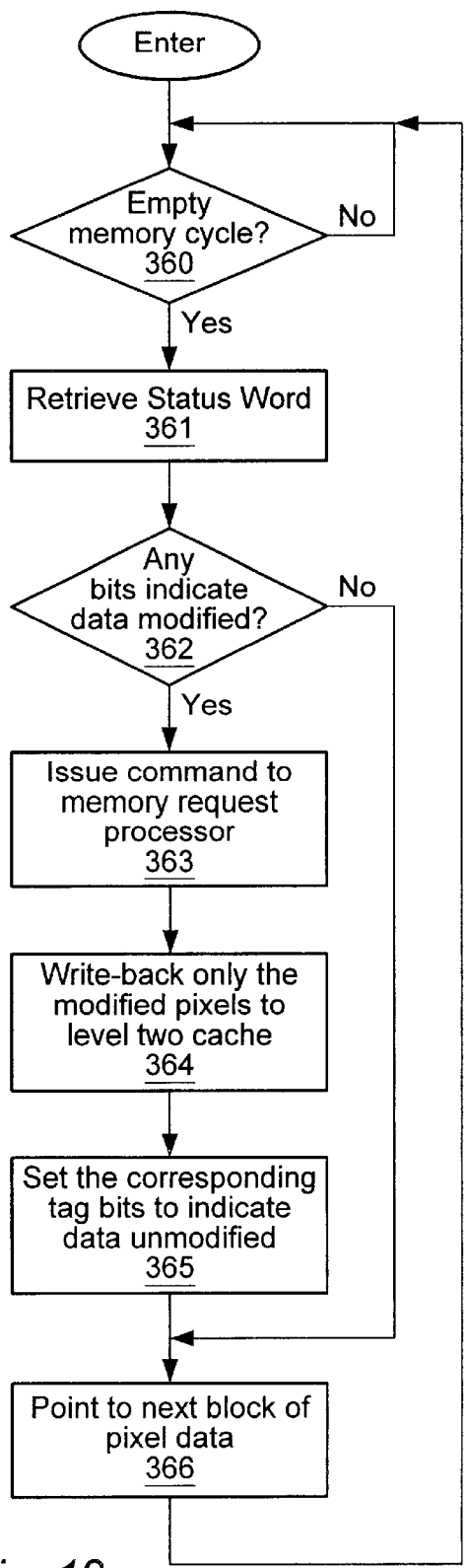
FIG. 12 is a diagrammatic illustration of one embodiment of the method to manage the two caches within the 3D-RAM device of FIG. 7.

Turning now to FIG. 12 a flow diagram is illustrated which represents one embodiment of a method for managing the cache memories utilizing the dirty tag bits described above. In this example, cache management or block cleansing occurs during empty memory cycles. Hence in step 360 execution of the procedure stalls until an empty memory cycle is detected. Once an empty memory cycle is encountered, the status word 350 corresponding to the current level one cache 315 memory block under examination is retrieved from the dirty tag bit array 341 (step 361). This status word contains the sixteen dirty tag bits corresponding to the sixteen pixel values within the block. In step 362, the status word 350 may be tested in order to determine if any of the dirty tag bits indicate the corresponding pixel data has been modified. If the result of the test indicates that no pixel data within the block has been modified, then the procedure skips to the examination of the next block. If however the status word indicates that pixel data within the block has been modified, then a command is issued to the memory request processor 335 requesting a cache operation (step 363). The memory request processor 335 responds to the request by commanding a write-back of the block containing the modified pixel data (step 364). The write-back may be effected by sending a write partial block command to the associated 3D-RAM device 310 using the status word as the argument of the command. The 3D-RAM device 310 may then execute the write partial block command by copying only those pixels indicated as being modified back to the level two cache 312. Furthermore, in those embodiments where the level two cache 312 is configured as a write-through cache the modified pixels are also simultaneously stored in the associated DRAM bank 311. Once the block transfer is complete, the status word may then be modified so that all bits are set to the state indicating the associated pixel data is unmodified (step 365). The next block to be examined is then indicated (step 366) and execution of the procedure resumes from the beginning.

Hence according to the illustrated embodiment, blocks within the level one cache 315 are kept "clean" (i.e., free of modified pixel data which does not exist also in the level two cache 312 and the DRAM bank 311) through periodic examination and write-back. These clean blocks are consequently available for future allocations, whereas a lack of clean blocks could potentially result in a stalled data pipeline of a high performance system.

In some embodiments, the dirty tag bits may also be employed in performing such operations as maskable writes. Maskable writes may be used to fill rectangular or irregularly shaped areas with a solid color or with a repetitive pattern. Turning now to FIG. 13, one example of an area fill operation is shown. In this example, an ellipse 500 represents the area to be filled with a solid color. The border of the ellipse 500 traverses several blocks of pixels at various angles creating several unique, partially full blocks. The ellipse 500 may therefore be considered to be irregularly shaped.

Figure 13A:
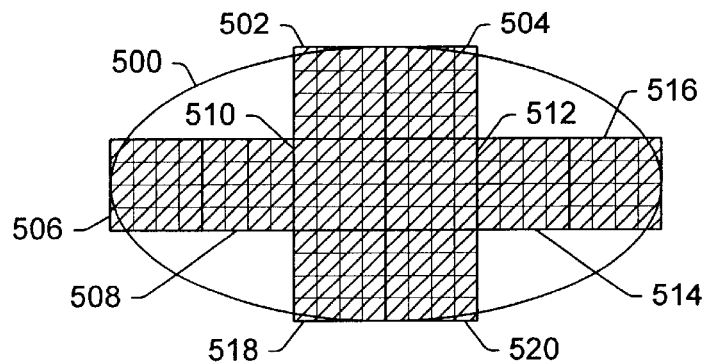
FIG. 13 is a diagrammatic illustration of one example of an area fill operation.

In FIG. 13a, the full blocks (i.e., blocks with no empty or invalid pixels) which may represent the interior of the ellipse 500 are shown. These full blocks (502, 504, 506, 508, 510, 512, 514, 516, 518, 520) may be transferred to the appropriate DRAM bank 311 by filling all sixteen pixels of an available block of the level one cache 315 with the fill color, and then issuing a write block command for each of the ten blocks in the ellipse 500.

Figure 13B:
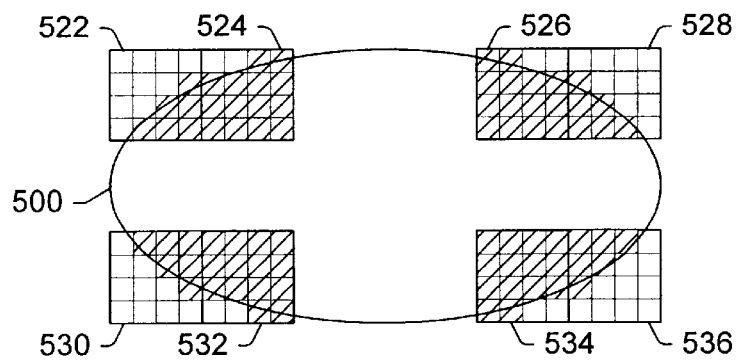

In FIG. 13b, the remaining eight blocks constituting the ellipse are shown. These eight blocks (522, 524, 526, 528, 530, 532, 534, 536) are all partially filled. This would require a large quantity (68 in this example) of single pixel write operations if no maskable write facility were provided for in the 3D-RAM 310. In performing single pixel writes, the corresponding block in DRAM 311 may first be transferred to the level one cache 315 (i.e., if the block represents a cache miss). The pixels within the block to be filled may then be modified, each with a single pixel write operation, and then the modified block may be transferred back to the corresponding DRAM bank 311 (i.e. if the level one cache 315 is full and there is another cache miss). This would be an inefficient method for filling the blocks which constitute the border of the ellipse 500. Using this method, there would be 68 single pixel writes, and potentially 16 block transfers.

Figure 13C:
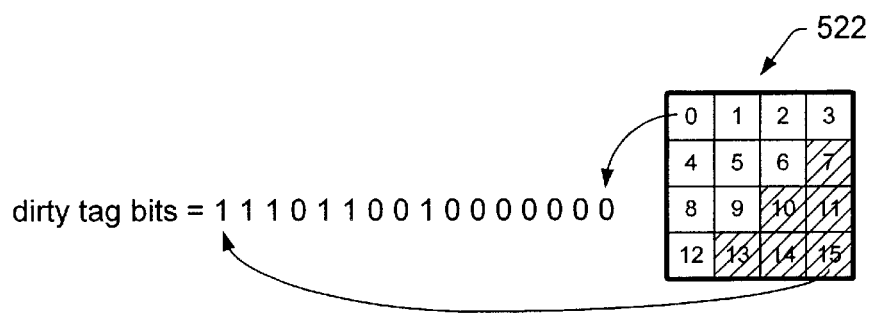

An alternative to performing the multitude of single pixel write operations would be to utilize the same block of level one cache that was used to fill the interior of the ellipse 500, transferring this block to each of the corresponding locations in the DRAM 311 with a mask which would prevent the empty or invalid pixels from being written. For example, in FIG. 13c partially filled block 522 is shown in greater detail. The dirty tag bits associated with the full block of fill color may be modified as shown in FIG. 13c, with each bit corresponding to an empty pixel cleared to a logic "0" and each bit corresponding to a valid pixel set to a logic "1".

Then, as the full block in level one cache 315 is transferred to the corresponding DRAM bank 311 utilizing a write partial block command, the dirty tag bits may ensure that only the pixels contained in the ellipse 500 are modified in the DRAM 311. In this way, no single pixel writes are issued, and 8 partial block transfers are executed.

As illustrated in the example of FIG. 13, the ability to perform write partial block commands may improve the efficiency of area fills where the boundaries of the area are irregular. In some embodiments of the 3D-RAM 310, these write partial block commands may utilize the dirty tag bits to identify the pixels to be transferred from the level one cache 315 to the DRAM 311. In the illustrated embodiment, modifying the state of the dirty tag bits may be facilitated by locating them external to the 3D-RAM 310, and hence making them more accessible to the graphics system.

Figure 14:
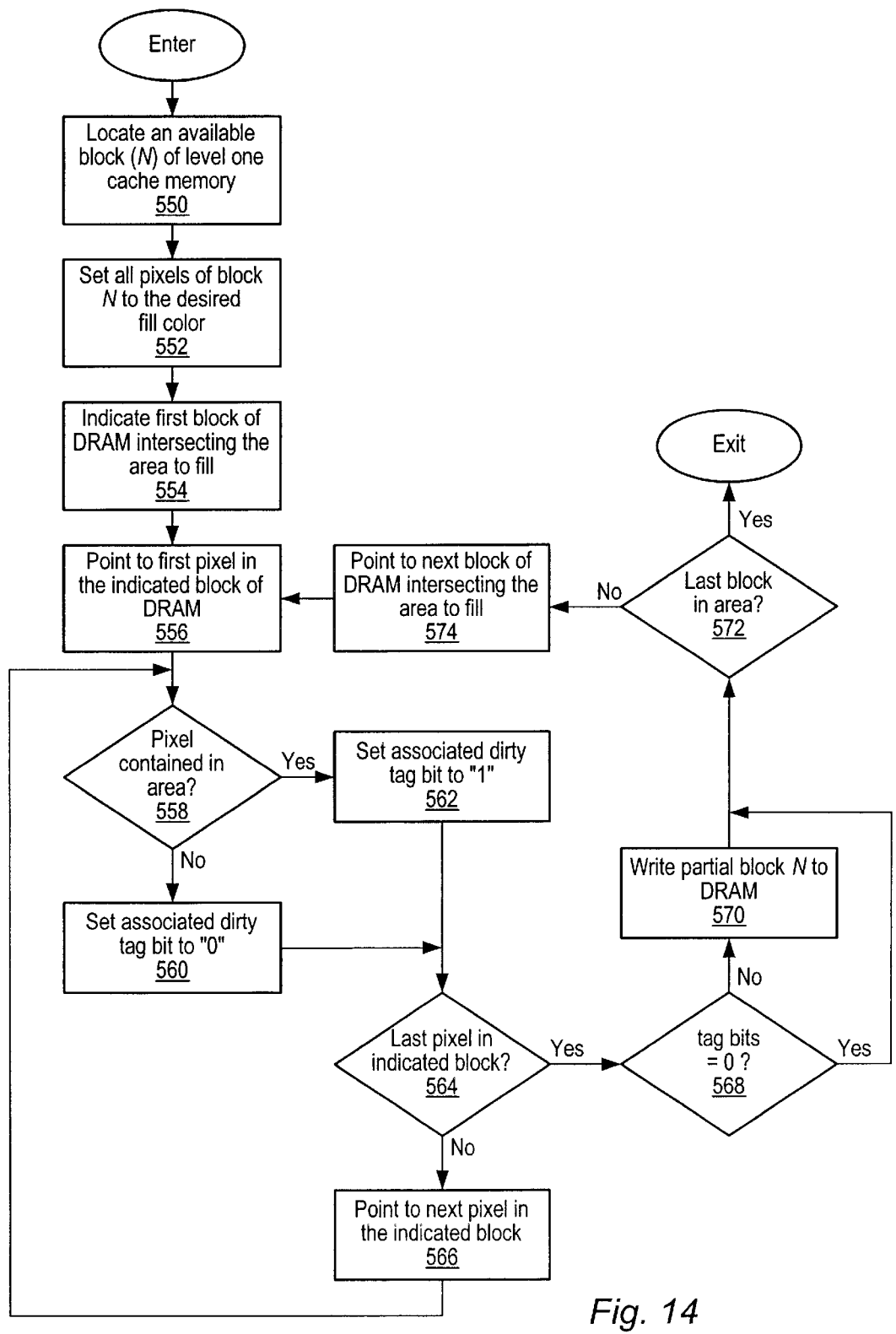
FIG. 14 is a diagrammatic illustration of one embodiment of a method to perform an area fill.

Turning now to FIG. 14, a block diagram illustrating one embodiment of a method for executing the area fill of the previous example is shown. First an available block (i.e., no dirty pixels) of level one cache 315 memory may be located (step 550). All the pixels contained in this available block may then be set to the value of the desired fill color (step 552). In some embodiments, the area to be filled may be horizontally scanned in rows of blocks, in other embodiments, the scanning may be along vertical columns of blocks. Regardless of the scanning direction, a starting block may be chosen (step 554), and the remaining blocks intersecting the area may be processed sequentially. For each block that intersects the area, all constituent pixels may be tested for inclusion in the area (steps 556, 558, 564 and 566). For those pixels which are determined to lie within the area to be filled, the corresponding dirty tag bit may be set to a logic "1" (step 562) otherwise, the dirty tag bit may be cleared to a logic "0" (step 560). Next, the associated dirty tag bits may be tested to verify that at least one pixel in the block lies within the area to be filled (step 568). If so, then a write partial block command may be issued to transfer the block of fill color from the level one cache 315 to the DRAM 311 (step 570). The write partial block command may transfer only those pixels corresponding to dirty tag bits which are asserted. If the last block intersecting the area to be filled has been processed (step 572) then the method ends execution, otherwise, the next block of DRAM 311 memory to be processed is indicated, and execution may branch back to step 556.

Figure 15:
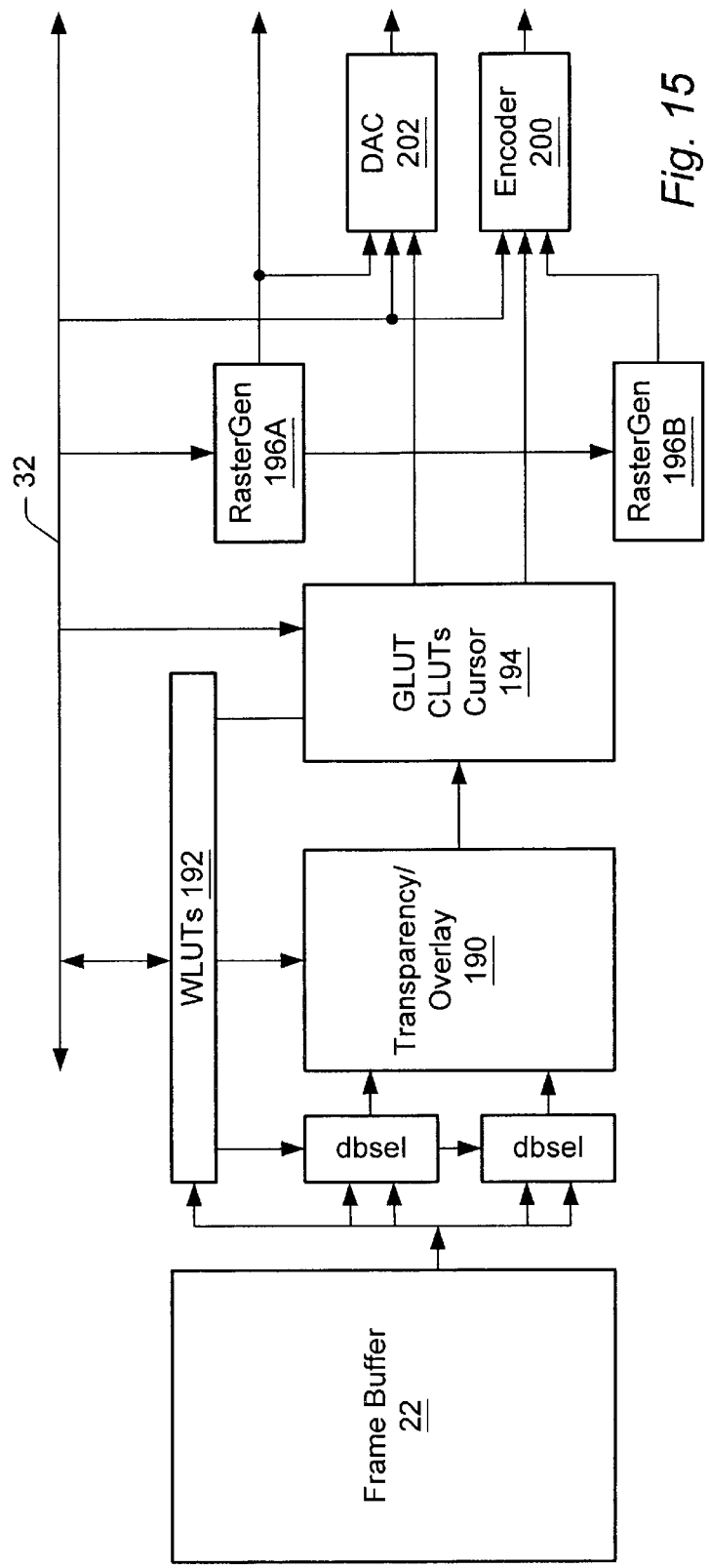
FIG. 15 is a functional block diagram of one embodiment of the video output processor of FIG. 3.

Video Output Processor—FIG. 15

Turning now to FIG. 15, one embodiment of a video output processor 24 is shown for thoroughness. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, pseudocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 202 may operate as the final output stage of graphics system 112. The DAC 202 translates the digital pixel data received from GLUT/CLUTs/Cursor unit 194 into analog video signals that are then sent to a display device. In one embodiment, DAC 202 may be bypassed or omitted completely in order to output digital pixel data in lieu of analog video signals. This may be useful when a display device is based on a digital technology (e.g., an LCD-type display or a digital micro-mirror display).

DAC 202 may be a red-green-blue digital-to-analog converter configured to provide an analog video output to a display device such as a cathode ray tube (CRT) monitor. In one embodiment, RGB DAC 202 may be configured to provide a high resolution RGB analog video output at dot rates of 240 MHz. Similarly, encoder 200 may be configured to supply an encoded video signal to a display. For example, encoder 200 may provide encoded NTSC or PAL video to an S-Video or composite video television monitor or recording device.

In other embodiments, the video output processor 24 may output pixel data to other combinations of displays. For example, by outputting pixel data to two DACs 202 (instead of one DAC 202 and one encoder 200), video output processor 24 may drive two CRTs. Alternately, by using two encoders 200, video output processor 24 may supply appropriate video input to two television monitors. Generally, many different combinations of display devices may be supported by supplying the proper output device and/or converter for that display device.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:
   a memory configured to receive and store graphics data, wherein the memory comprises,
      a RAM configured to store the graphics data,
      a level two cache memory coupled to the RAM, and
      a level one cache memory coupled to the level two cache memory;
   an array of registers configured to store dirty tag bits, wherein the dirty tag bits indicate the status of the graphics data in the level one cache, wherein the status indicates whether the graphics data is modified or unmodified; and
   a memory request processor coupled to the memory and to the array of registers, wherein the memory request processor controls the transfer of graphics data from the level one cache to the level two cache according to the dirty tag bits;
   a global write bus coupled to the level two cache memory and the level one cache memory, and a global read bus coupled to the level two cache memory and the level one cache memory, wherein:
      the global write bus is configured to transfer an entire block of graphics data between the level one cache memory and the level two cache memory in parallel,
      the global read bus is configured to transfer an entire block of graphics data between the level two cache memory and the level one cache memory in parallel, and the level two cache memory is further configured to receive and store an entire page of graphics data in a single retrieve operation from the RAM;

wherein the global write bus operates independently of the global read bus.

2. The graphics system of claim 1, wherein the graphics data comprises samples.

3. The graphics system of claim 2, wherein the level two cache memory comprises a plurality of level two cache memories, wherein the number of level two cache memories is equal to the number of DRAM banks, wherein one of the level two cache memories is coupled to each DRAM bank.

4. The graphics system of claim 1, wherein the RAM comprises a plurality of DRAM banks.

5. The graphics system of claim 1, wherein the level one cache memory comprises a multi-ported SRAM memory.

6. The graphics system of claim 1, wherein the level two cache memory is configured as a write-through cache, and wherein the level one cache is configured as a write-back cache.

7. The graphics system of claim 1, wherein the memory comprises one or more 3D-RAM devices.

8. The graphics system of claim 7, wherein the memory comprises one or more 3D-RAM64 devices.

9. The graphics system of claim 1, wherein the memory further comprises:
a request preprocessor configured to receive requests for graphics data stored in the memory, wherein the request preprocessor transforms the requests into memory commands according to the contents of the cache memories, and wherein the memory commands comprise cache commands and pixel commands;
a cache queue coupled to the request preprocessor and to the memory request processor, wherein the cache queue stores memory commands and delivers the memory commands to the memory request processor on a first-in-first-out basis;
a pixel queue coupled to the request preprocessor, wherein the pixel queue stores pixel commands and outputs the pixel commands on a first-in-first-out basis; and
a pixel request processor coupled to the pixel queue, wherein the pixel request processor controls the transfer of graphics data into and out of the memory according to the pixel commands.

10. The graphics system of claim 1, further comprising a shift register coupled to the memory, wherein the shift register is configured to receive and store a plurality of graphics data from the memory, and wherein the shift register is further configured to output the graphics data serially according to an external clock signal.

11. The graphics system of claim 10, further comprising a display device coupled to the shift register and configured to display images according to the graphics data.

12. The system of claim 1, wherein the RAM comprises a set of DRAM banks, wherein the memory request processor asserts a write-back command on a DRAM control bus of the memory in a first bus cycle and places dirty tag contents corresponding to the write-back command on the DRAM control bus in a second bus cycle.

13. A graphics system comprising:
a memory array configured to receive and store graphics data, wherein the memory array comprises:
a plurality of DRAM banks, wherein each DRAM bank is logically subdivided into pages, and wherein each page is further subdivided into blocks,
a plurality of level two write-through caches coupled to the DRAM banks,
wherein the number of level two caches is equal to the number of DRAM banks,
and wherein the storage capacity of each of the level two caches is equal to a page,
a level one write-back cache coupled to the level two caches and configured to receive and store a plurality of graphics data blocks;
an array of memory circuits configured to store the status of the graphics data stored in the level one cache, wherein the status indicates whether the graphics data is modified or unmodified; and
a cache controller coupled to the level two caches, the level one cache, and the array of memory circuits, wherein the cache controller is configured to control the transfer of graphics data between the caches according to the contents of the memory circuits;
a global write bus coupled to the level one cache and the level two caches, and a global read bus coupled to the level one cache and the level two caches, wherein:
the global write bus is configured to transfer an entire block of graphics data from the level one cache to a selected one of the level two caches in parallel,
the global read bus is configured to transfer an entire block of graphics data from a selected one of the level two caches to the level one cache in parallel, and
each of the level two caches is further configured to receive and store an entire page of graphics data from a corresponding DRAM bank in a single retrieve operation;
wherein the global write bus operates independently of the global read bus.

14. The graphics system of claim 13, wherein the cache controller further comprises:
a block cleanser coupled to the level one cache and configured to periodically examine blocks of the graphics data stored in the level one cache, wherein the blocks containing modified graphics data are copied back to a corresponding one of the level two caches, wherein the copying is performed by only transferring the modified data values as identified by the array of memory circuits.

15. The graphics system of claim 13, wherein the memory array further comprises an ALU coupled to the level one cache, wherein the ALU is configured to receive the graphics data as an operand, wherein the ALU is configured to receive data from the level one cache as a second operand, wherein the ALU is configured to arithmetically combine the two operands, and wherein the ALU is further configured to store the result of the arithmetic combination in the level one cache.

16. The graphics system of claim 13, further comprising a bus interface, wherein the bus interface is configured to receive graphics data from a host system, and wherein the bus interface is further configured to reformat and communicate the graphics data to the graphics system.

17. The graphics system of claim 13, wherein the level one cache comprises a plurality of pixel caches, wherein each pixel cache is coupled to a number of DRAM banks, wherein the number of DRAM banks is greater than one.

18. The graphics system of claim 13, wherein each memory circuit in the array of memory circuits corresponds to one and only one pixel of graphics data in the level one cache, and wherein the array of memory circuits is grouped into words, wherein the words correspond to blocks of graphics data in the level one cache.

19. The graphics system of claim 13, further comprising control logic coupled to the array of memory circuits and to the cache controller, wherein the control logic sets the corresponding memory circuits to the state indicating the pixel data is unmodified as part of performing block transfers between the level two cache and the level one cache, and wherein the control logic sets the corresponding flip-flops to the state indicating the pixel data is modified as part of write operations to the level one cache.

20. The graphics system of claim 13, further comprising selection logic coupled to the array of memory circuits and to the cache controller, wherein the selection logic receives information from the cache controller indicating a block of graphics data in the level one cache to be accessed and responds by outputting the status contained in the corresponding memory circuits.

21. The graphics system of claim 13, wherein the contents of the array of memory circuits may be modified independent of the state of the corresponding data in the level one cache, wherein the cache controller is configured to transfer a partial block of graphics data from the level one cache to the level two cache, wherein the partial block comprises individual elements of graphics data corresponding to memory circuits having contents set to indicate the data is modified.

22. The system of claim 13, wherein the cache controller asserts a write-back command on a DRAM control bus of the memory array in a first bus cycle and places dirty tag contents corresponding to the write-back command on the DRAM control bus in a second bus cycle.

23. A method for storing pixel data in a memory array, wherein the method comprises:
   a) arithmetically combining pixel data with the contents of a temporary storage space of the memory array, wherein the result is stored in the temporary storage space;
   b) maintaining an array of status bits, external to the memory array, indicative of whether or not data stored in the temporary storage space has been modified;
   c) periodically determining if any of the status bits indicate that the corresponding data within a block of the temporary storage space has been modified;
   d) issuing a request to write the block of data to a level two cache of the memory array if the corresponding status bits indicate that the data has been modified;
   e) copying only modified data in the block, as indicated by the corresponding status bits, from the temporary storage space to the level two cache; and
   f) changing the state of the status bits corresponding to the block of data to indicate the associated data is unmodified;
   g) transferring a first entire block of graphics data from the temporary storage space to a level two cache in parallel over a global write bus;
   h) transferring a second entire block of graphics data from the level two cache to the temporary storage space in parallel over a global read bus;
   i) retrieving an entire page of graphics data from a DRAM bank of the memory array to the level two cache in a single DRAM retrieve operation; wherein the global write bus operates independently of the global read bus.

24. The method of claim 23, wherein the copying of modified data comprises issuing a write partial block command to the memory array, wherein the write partial block command employs an argument indicating which of the data values are to be copied, wherein the argument is retrieved from the array of status bits.

25. The method of claim 23, wherein (c), (d), (e) and (f) are executed during empty memory cycles.

26. The method of claim 23, wherein steps (c), (d), (e) and (f) are forced to be executed in response to an urgent request for allocation of memory within the temporary storage space.

27. The method of claim 23, further comprising:
   determining whether the block of temporary storage space being examined is currently in use; and
   delaying the execution of steps (d), (e) and (f) in response to detecting that the block is in use.

28. The method of claim 23, wherein an entire word of status bits is checked in a single operation, wherein each bit of the checked word corresponds to a single storage location within a block in the temporary storage space, and wherein the number of bits in the checked word is equal to the number of storage locations within the block of temporary storage space.

29. The method of claim 23, wherein the copying of a block of data from the temporary storage space to a level two cache results in a write-through of the level two cache, wherein the block of data is simultaneously written through to a bank of DRAM memory.

30. A method for externally managing cached pixel data within a 3D-RAM memory device, the method comprising:
   identifying a block within a level one cache of the 3D-RAM memory device, wherein the block is either a target or a source for a data block transfer with a level two cache of the 3D-RAM memory device;
   maintaining status bits, external to the 3D-RAM, for each data block in the level one cache;
   setting one or more of the status bits to a known state in response to a data block transfer, wherein the known state indicates that the data within the block of level one cache is unmodified; and
   identifying write operations to the level one cache, wherein the source of the write data is external to the 3D-RAM;
   setting the status bit associated with the data value in the level one cache to a known state in response to a write operation, wherein the known state indicates the data within the level one cache is modified; and
   synchronizing the data in the level two cache to the data in the level one cache according to the state information stored in the status bits;
   transferring a first entire block of graphics data from the level one cache to a level two cache in parallel over a global write bus;
   transferring a second entire block of graphics data from the level two cache to the level one cache in parallel over a global read bus;
   retrieving an entire page of graphics data from a DRAM bank of the 3D-RAM memory device to the level two cache in a single retrieve operation;
   wherein the global write bus operates independently of the global read bus.

31. The method of claim 30, wherein the association between a group of status bits and a block of data in the level one cache is constant and not re-assignable.

32. The method of claim 30, further comprising:
   checking the status bits periodically;
   identifying blocks of data within the level one cache with modified values; and issuing a write partial block command to the 3D-RAM, wherein the write partial block command causes a block of data in the level one cache to be copied to the level two cache, wherein the write partial block command transfers only data values indicated as modified.

33. A method for reducing the power consumption in a 3D-RAM, the method comprising:

associating dirty tag bits with pixels stored in a level one cache of the 3D-RAM, wherein the dirty tag bits are external to the 3D-RAM, wherein the state of the dirty tag bits indicate that the associated pixel is dirty if the pixel has been modified or clean if the pixel has not been modified;

grouping the dirty tag bits into status words, wherein a status word is associated with one and only one block of the level one cache memory; and writing-back blocks of pixel data within the level one cache to a level two cache of the 3D-RAM according to the contents of the status words, wherein only dirty pixels are written-back;

transferring a first entire block of graphics data from the level one cache to a level two cache in parallel over a global write bus;

transferring a second entire block of graphics data from the level two cache to the level one cache in parallel over a global read bus;

retrieving an entire page of graphics data from a DRAM bank of the 3D-RAM to the level two cache in a single DRAM retrieve operation;

wherein the global write bus operates independently of the global read bus.

34. The method of claim 33, wherein the writing-back occurs on a periodic basis.

35. The method of claim 33, further comprising:

clearing the dirty tag bits in response to requesting block transfers within the 3D-RAM, wherein the dirty tag bits cleared are associated with the block of level one cache memory affected by the transfer; and setting the dirty tag bits in response to writing to the 3D-RAM, wherein the dirty tag bits set are associated with the pixels being written to in the level one cache.

36. The method of claim 33, wherein the writing-back of pixel data from the level one cache to the level two cache occurs only during idle memory cycles.

* * * * *